(12) United States Patent
Andrews et al.

(10) Patent No.: US 8,721,743 B2
(45) Date of Patent: May 13, 2014

(54) BATTERY CATHODES

(75) Inventors: Albert A. Andrews, Cleveland, TN (US); Eric V. Ball, Ocoee, TN (US); Howard E. Brookshire, Cleveland, TN (US)

(73) Assignee: The Gillette Company, Boston, MA (US)

( * ) Notice: Subject to any disclaimer, the term of this patent is extended or adjusted under 35 U.S.C. 154(b) by 1917 days.

(21) Appl. No.: 11/254,307

(22) Filed: Oct. 20, 2005

(65) Prior Publication Data

US 2006/0085971 A1    Apr. 27, 2006

Related U.S. Application Data

(63) Continuation-in-part of application No. 10/970,534, filed on Oct. 21, 2004, now abandoned.

(51) Int. Cl.
*H01M 4/08* (2006.01)
*H01M 4/04* (2006.01)
*H01M 6/08* (2006.01)

(52) U.S. Cl.
USPC ........................................................ 29/623.1

(58) Field of Classification Search
USPC ........................................................ 29/623.1
See application file for complete search history.

(56) References Cited

U.S. PATENT DOCUMENTS

| | | |
|---|---|---|
| 320,232 A | 6/1885 | DuShane |
| 345,124 A | 7/1886 | DeVirloy et al. |
| 720,321 A | 2/1903 | Buchanan |
| 2,424,149 A | 7/1947 | Chaplin |
| 3,205,097 A | 9/1965 | Clune et al. |
| 3,759,746 A | 9/1973 | McCallum |
| 3,759,747 A | 9/1973 | Schaer |
| 3,893,870 A | 7/1975 | Kozawa |
| 4,553,419 A | 11/1985 | Goodman |
| 4,777,100 A | 10/1988 | Chalilpoyil et al. |
| 5,300,371 A | 4/1994 | Tomantschger et al. |
| 5,342,712 A | 8/1994 | Mieczkowska et al. |
| 5,487,961 A | 1/1996 | Strangways et al. |
| 5,536,596 A | 7/1996 | Lake |
| 5,556,722 A | 9/1996 | Narukawa et al. |
| 5,677,080 A | 10/1997 | Chen |
| 5,882,815 A | 3/1999 | Tagawa |
| 6,007,936 A | 12/1999 | Iwase et al. |

(Continued)

FOREIGN PATENT DOCUMENTS

| | | |
|---|---|---|
| CA | 1263697 | 5/1989 |
| EP | 0654837 A1 | 5/1995 |

(Continued)

OTHER PUBLICATIONS

Falk, S. et al., "Alkaline Storage Batteries", John Wiley & Sons, Inc., 1969, pp. 1-41.

(Continued)

*Primary Examiner* — Gregg Cantelmo
(74) *Attorney, Agent, or Firm* — Fish & Richardson P.C.

(57) ABSTRACT

Batteries and related methods are disclosed. In some embodiments, a method of making a battery can include passing a mandrel through an opening defined by a pellet that includes an electrode composition. The mandrel can have a transverse cross-section with a first dimension and a second dimension that is larger than the first dimension.

17 Claims, 15 Drawing Sheets

(56) References Cited

U.S. PATENT DOCUMENTS

| | | | |
|---|---|---|---|
| 6,013,379 A | 1/2000 | Uesugi et al. | |
| 6,074,781 A | 6/2000 | Jurca | |
| 6,081,992 A | 7/2000 | Kelemen et al. | |
| 6,207,322 B1 * | 3/2001 | Kelsey et al. | 429/206 |
| 6,242,121 B1 | 6/2001 | Pedicini et al. | |
| 6,274,261 B1 | 8/2001 | Tinker et al. | |
| 6,284,410 B1 | 9/2001 | Durkot et al. | |
| 6,342,317 B1 | 1/2002 | Patel et al. | |
| 6,410,187 B1 * | 6/2002 | Luo et al. | 429/206 |
| 6,500,576 B1 | 12/2002 | Davis et al. | |
| 6,521,378 B2 | 2/2003 | Durkot et al. | |
| 6,589,612 B1 | 7/2003 | Cintra et al. | |
| 6,858,349 B1 | 2/2005 | Luo et al. | |
| 2002/0172867 A1 | 11/2002 | Anglin | |
| 2004/0175613 A1 | 9/2004 | Eylem et al. | |
| 2004/0258995 A1 | 12/2004 | Costanzo et al. | |
| 2005/0136328 A1 | 6/2005 | Eylem et al. | |

FOREIGN PATENT DOCUMENTS

| | | |
|---|---|---|
| EP | 0848441 A1 | 11/1997 |
| GB | 1404654 | 9/1971 |
| GB | 2231196 A | 11/1990 |
| JP | 61214362 | 9/1986 |
| JP | 63150855 | 6/1988 |
| JP | 2012762 | 1/1990 |
| JP | 5041211 | 2/1993 |
| JP | 6333550 | 2/1994 |
| JP | 11217266 | 8/1999 |
| WO | WO 99/34459 | 7/1999 |
| WO | WO00/01022 | 1/2000 |
| WO | WO2004/027894 A2 | 1/2004 |
| WO | WO2004/027894 A3 | 1/2004 |

OTHER PUBLICATIONS

Linden, D., *Handbook of Batteries*, McGraw-Hill, Inc., 1995, "1.4 Classification of Cells and Batteries", pp. 1.9-1.11; "7.1 General Characteristics and Applications of Primary Batteries", pp. 7.3-7.7; "23.1 General Characteristics and Applications of Secondary Batteries", pp. 23.3-23.12 "28.2 Chemistry", pp. 28.2-28.5.

Copeland et al., U.S. Appl. No. 09/645,632, filed Aug. 24, 2000.

* cited by examiner

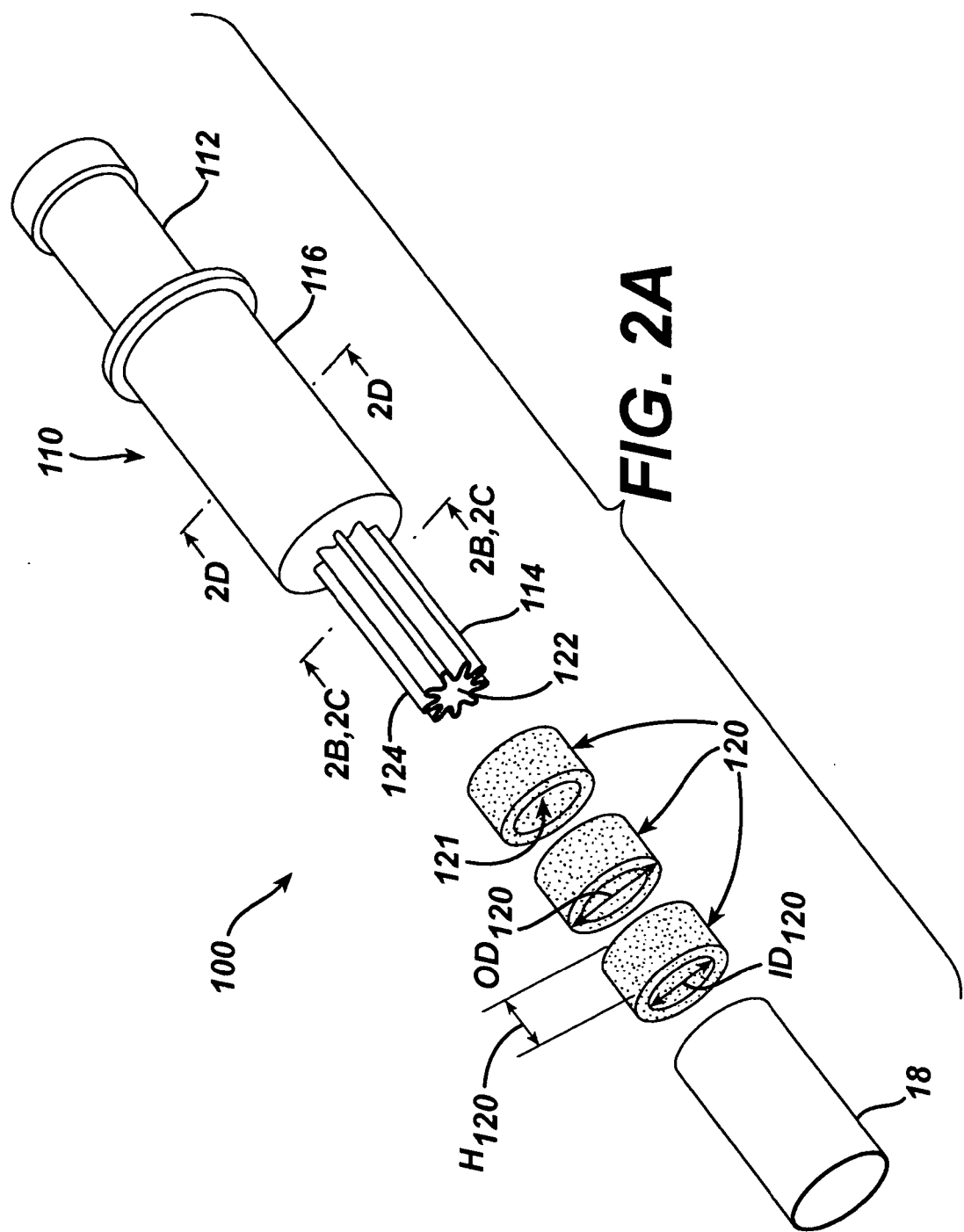

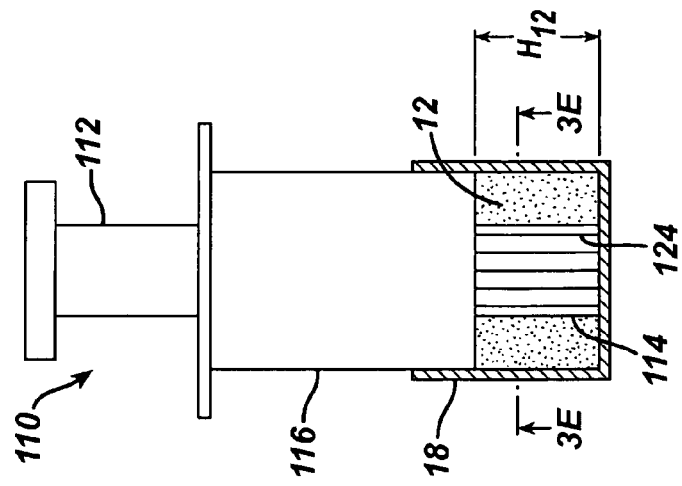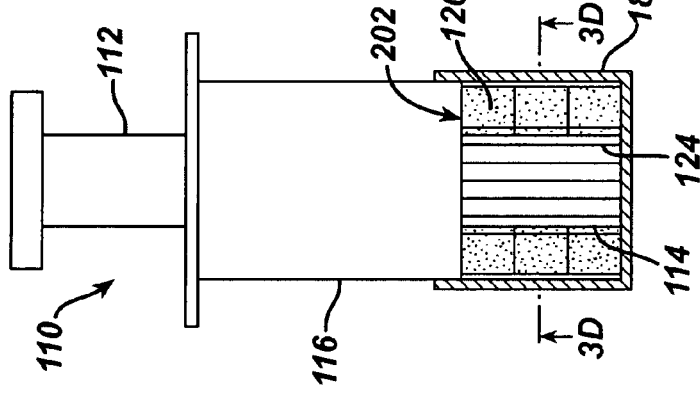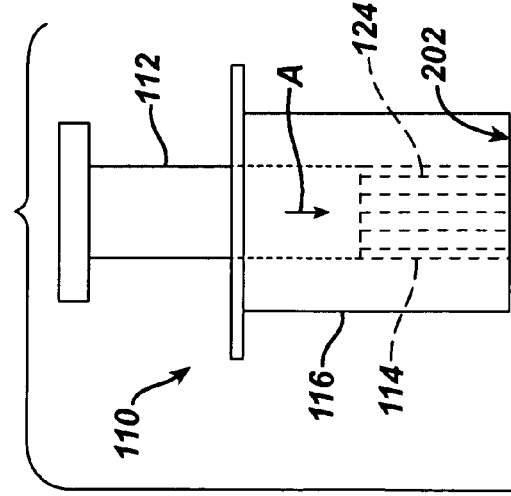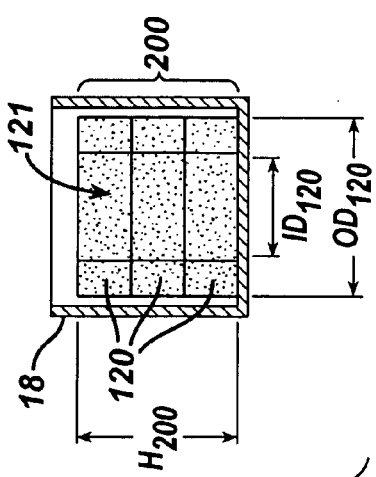

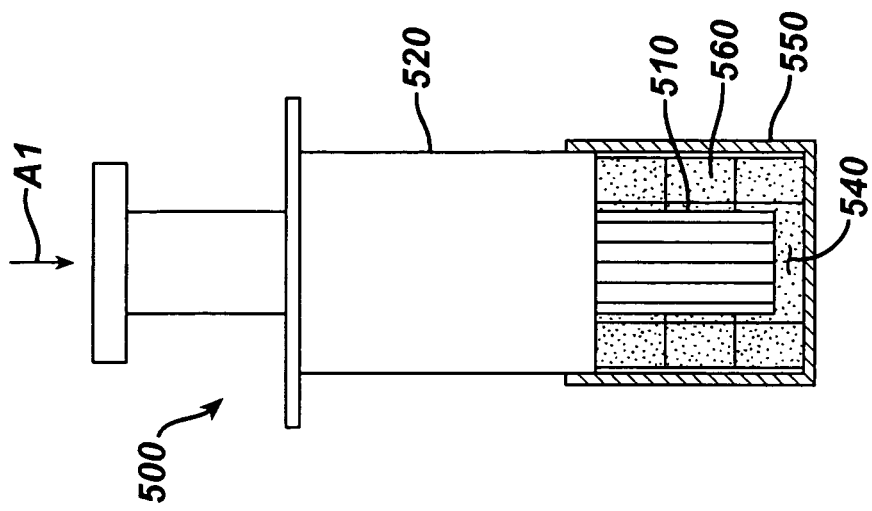
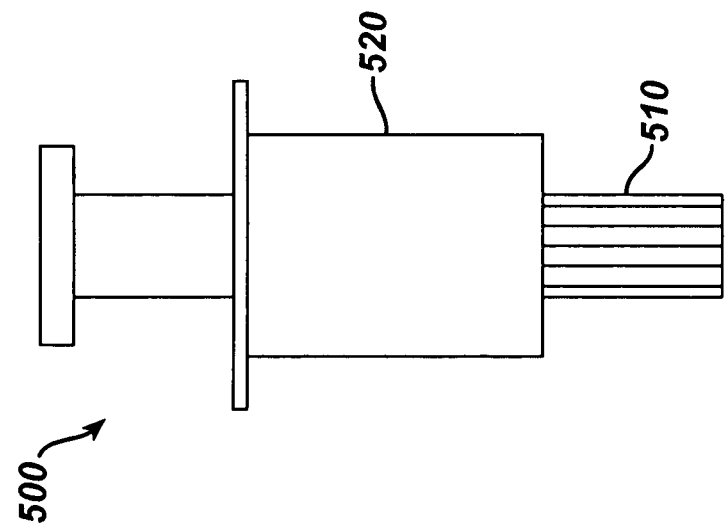

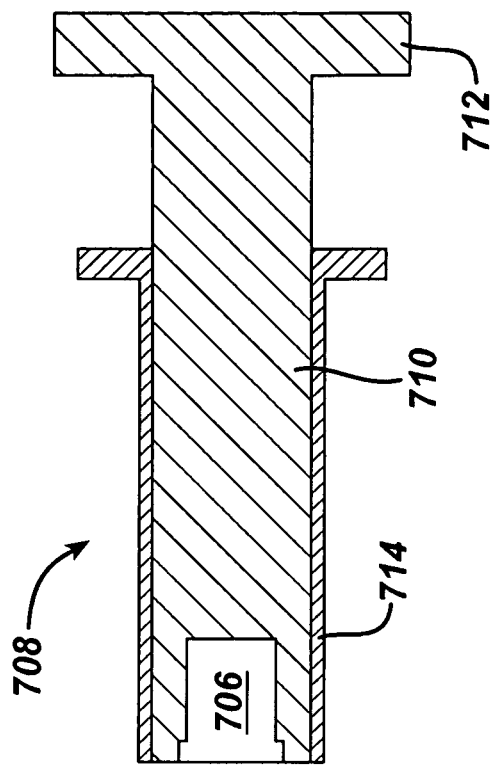
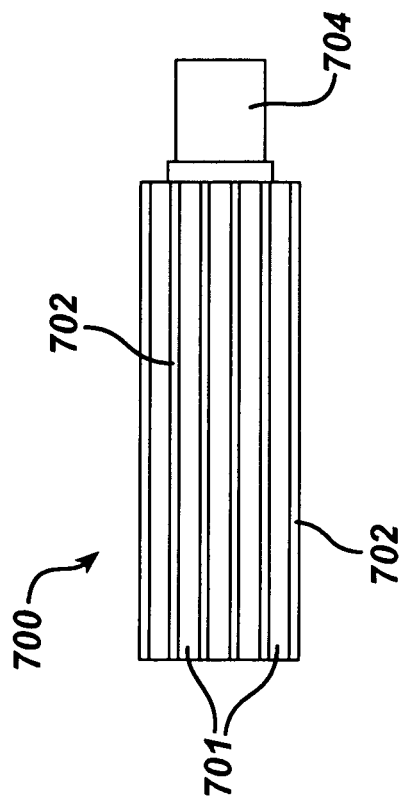
FIG. 12A
FIG. 12B

BATTERY CATHODES

CROSS-REFERENCE TO RELATED APPLICATIONS

This application is a continuation-in-part of, and claims priority under 35 U.S.C. 120 to, U.S. patent application Ser. No. 10/970,534, filed on Oct. 21, 2004 and entitled "Battery Cathodes", which is incorporated herein by reference in its entirety. The prior application has been abandoned.

TECHNICAL FIELD

The invention relates to batteries, as well as to related methods.

BACKGROUND

Batteries or electrochemical cells are commonly used electrical energy sources. A battery contains a negative electrode, typically called the anode, and a positive electrode, typically called the cathode. The anode contains an active material that can be oxidized; the cathode contains or consumes an active material that can be reduced. The anode active material is capable of reducing the cathode active material.

When a battery is used as an electrical energy source in a device, electrical contact is made to the anode and the cathode, allowing electrons to flow through the device and permitting the respective oxidation and reduction reactions to occur to provide electrical power. An electrolyte in contact with the anode and the cathode contains ions that flow through the separator between the electrodes to maintain charge balance throughout the battery during discharge.

SUMMARY

The invention relates to batteries, as well as to related methods.

In one aspect, the invention relates to methods of making a battery, such as an alkaline battery (e.g., a D battery). In some embodiments, batteries that are formed using the methods can have cathodes with a relatively high surface area. Alternatively or additionally, the cathodes may have a relatively high electrolyte absorption rate, and may be able to absorb more electrolyte than cathodes in batteries that are formed by other methods. Thus, batteries that include the cathodes may contain a higher weight percent of electrolyte than other batteries. In certain embodiments, batteries that are formed using the methods may contain less cathode material (e.g., about two percent less, about three percent less) than batteries that are formed using other methods, while exhibiting comparable electrochemical performance. Thus, batteries that are formed using the methods may cost less to manufacture than batteries that are formed using other methods. Batteries that are formed using the methods may exhibit enhanced electrochemical performance when continuously discharged. Furthermore, the methods can be relatively efficient. For example, the methods can be used both to form a groove in a pellet that includes an electrode composition, and to compact the pellet to form an electrode (e.g., a cathode, an anode). In some embodiments, groove formation and compaction can occur simultaneously, thereby saving time during a battery manufacturing process. In certain embodiments, the methods can include forming a groove in multiple (e.g., two, three, four, five) pellets that have been disposed in a battery housing, while also compacting the pellets to form an electrode. In some embodiments, the methods may not include orienting the multiple pellets relative to each other prior to groove formation and/or compaction. The methods can provide a cathode that has an optimal density, and/or can allow for the compaction of cathode pellets without sacrificing the optimal density of the cathode that is formed. In some embodiments, the methods can limit and/or prevent a housing in which an electrode is being formed from experiencing significant wear during electrode formation.

In another aspect, the invention features a method of making a battery. The method includes passing a mandrel through an opening defined by a pellet including an electrode composition. The mandrel has a transverse cross-section with a first dimension (e.g., a diameter, a width, a length) and a second dimension (e.g., a diameter, a width, a length) that is larger than the first dimension. The method also includes applying pressure to the pellet to form an electrode. The pressure is applied to the pellet either while the mandrel is passed through the opening or after the mandrel is passed through the opening.

In an additional aspect, the invention features a method of making a battery. The method includes contacting a mandrel with an interior region of a pellet, and then applying pressure to the pellet to form an electrode. The mandrel includes at least one lobe, and the pellet includes an electrode composition.

In a further aspect, the invention features a method of making a battery. The method includes placing a mandrel into a hole defined by a pellet, and then applying pressure to the pellet to form an electrode. The mandrel includes at least one lobe, and the pellet includes an electrode composition.

In another aspect, the invention features a method of making a battery. The method includes contacting a mandrel with a pellet. The pellet includes an electrode composition and has an opening defining an interior surface of the pellet. The method also includes forming at least one groove in the interior surface of the pellet and applying pressure to the pellet to form an electrode. The pressure is applied to the pellet either during formation of the groove or after formation of the groove.

In an additional aspect, the invention features a method of making a battery. The method includes placing a plurality of pellets (e.g., three pellets, four pellets) in a housing, each of the pellets including an electrode composition and having an opening defining an interior surface of the pellet. The method also includes forming at least one groove in the interior surfaces of the pellets with a mandrel having a transverse cross-section with a first dimension (e.g., a diameter, a width, a length) and a second dimension (e.g., a diameter, a width, a length) that is larger than the first dimension. The method additionally includes compacting the pellets with a sleeve that slidably receives the mandrel. The pellets are compacted with the sleeve either during formation of the groove or after formation of the groove. The method further includes placing a separator in the housing and placing an anode in the housing.

In a further aspect, the invention features a method of making a battery. The method includes passing a mandrel through an opening defined by a pellet. The pellet includes an electrode composition, and the mandrel has a sinusoidal cross-section.

In another aspect, the invention features a method of making a battery, the method including passing a mandrel through an opening defined by a pellet that includes an electrode composition. The mandrel has a transverse cross-section with a first dimension (e.g., a diameter, a width, a length) and a second dimension (e.g., a diameter, a width, a length) that is larger than the first dimension.

In an additional aspect, the invention features a method of making a battery, the method including contacting a mandrel that has at least one lobe with an interior region of a pellet that includes an electrode composition.

In a further aspect, the invention features a method of making a battery, the method including contacting a mandrel with a pellet. The pellet includes an electrode composition and has an opening defining an interior surface of the pellet. The method also includes forming at least one groove in the interior surface of the pellet.

In another aspect, the invention features a method of making a battery, the method including placing a plurality of pellets (e.g., three pellets, four pellets) in a housing. Each of the pellets includes an electrode composition and has an opening that defines an interior surface of the pellet. The method also includes forming at least one groove in the interior surfaces of the pellets with a mandrel that has a transverse cross-section with a first dimension (e.g., a diameter, a width, a length) and a second dimension (e.g., a diameter, a width, a length) that is larger than the first dimension. The method further includes compacting the pellets with a sleeve slidably receiving the mandrel, placing a separator in the housing, and placing an anode in the housing.

Embodiments can include one or more of the following features.

The method can further include contacting the pellet with a sleeve that slidably receives the mandrel (e.g., applying pressure to the pellet). Contacting the pellet with a sleeve can include applying a pressure of at least about one psi and/or at most about 5,000 psi to the sleeve. For example, contacting the pellet with a sleeve can include applying a pressure of from about 350 psi to about 1,000 psi (e.g., from about 350 psi to about 500 psi) to the sleeve. In some embodiments, contacting the pellet with a sleeve can include flowing a portion of the pellet toward the mandrel.

The pellet can be cylindrical. The pellet can have a circular transverse cross-section or a non-circular transverse cross-section. The pellet can have an irregular transverse cross-section.

In certain embodiments, passing a mandrel through an opening defined by a pellet can include forming at least one groove in the pellet. The opening defined by the pellet can have a dimension (e.g., a diameter, a width, a length) of at least 0.001 millimeter (e.g., at least about 0.1 millimeter, at least about 10 millimeters, at least about 21.5 millimeters). The opening of the pellet can have a first dimension of at least about 0.1 millimeter and a second dimension of at least about 0.1 millimeter.

The first dimension of the transverse-cross section of the mandrel can be at most about 80 millimeters (e.g., at most about 34 millimeters, at most about 21.5 millimeters, at most about 10 millimeters, at most about one millimeter). Alternatively or additionally, the second dimension of the transverse-cross section of the mandrel can be at most about 80 millimeters (e.g., at most about 34 millimeters, at most about 25 millimeters, at most about 10 millimeters). The difference between the second dimension and the first dimension of the transverse cross-section of the mandrel can be at least 0.0001 millimeter (e.g., at least about 0.1 millimeter, at least about 0.5 millimeter, at least about one millimeter, at least about 1.5 millimeters, at least about two millimeters).

The mandrel can include a ceramic, a carbide, and/or steel. In some embodiments, the mandrel can include yttrium-stabilized zirconia. The mandrel can have at least one lobe. The lobe can have a rounded surface and/or can have an angular surface. In certain embodiments, the lobe can have an elliptical, square, triangular, or rectangular transverse cross-section. The mandrel can include two lobes having different shapes and/or sizes. The mandrel can have a mandrel body. The lobe can be integrally formed with the mandrel body or can be attached (e.g., welded, fastened) to the mandrel body. The mandrel body can have a circular transverse cross-section, or a non-circular transverse cross-section. The mandrel and/or mandrel body can have an irregular transverse cross-section. The mandrel and/or mandrel body can have a sinusoidal cross-section (e.g., a sinusoidal transverse cross-section). In some embodiments, the mandrel and/or mandrel body can have a cross-section (e.g., a transverse cross-section) defining a sinusoidal surface.

The method can further include disposing the pellet in a housing. The housing can have a circular transverse cross-section and/or a non-circular transverse cross-section. The distance between an interior surface of the housing and an exterior surface of the pellet can be at least 0.0001 millimeter (e.g., at least about 0.01 millimeter, at least about 0.05 millimeter, at least about 0.08 millimeter). The difference between a dimension (e.g., a diameter) of the opening defined by the pellet and the first and/or second dimension of the transverse cross-section of the mandrel can be at least 0.0001 millimeter (e.g., at least about 0.05 millimeter, at least about 0.1 millimeter, at least about 0.2 millimeter, at least about 0.3 millimeter). In some embodiments, the pellet or plurality of pellets can include a cathode composition or an anode composition. In certain embodiments, the method can include adding an electrolyte and/or a separator into the housing.

Other aspects, features, and advantages of the invention are in the drawings, description, and claims.

DESCRIPTION OF DRAWINGS

FIG. 2A is an exploded perspective view of an embodiment of an apparatus for forming an electrode.

FIGS. 3A-3C illustrate an embodiment of a method of making an electrode.

FIG. 6A is a side view of an apparatus for forming an electrode.

FIG. 6B illustrates an embodiment of a method of making an electrode, using the apparatus of FIG. 6A.

FIG. 12A is a side view of an embodiment of a component of an apparatus for forming an electrode.

FIG. 12B is a side cross-sectional view of an embodiment of a component of an apparatus for forming an electrode.

DETAILED DESCRIPTION

Figure 1A:
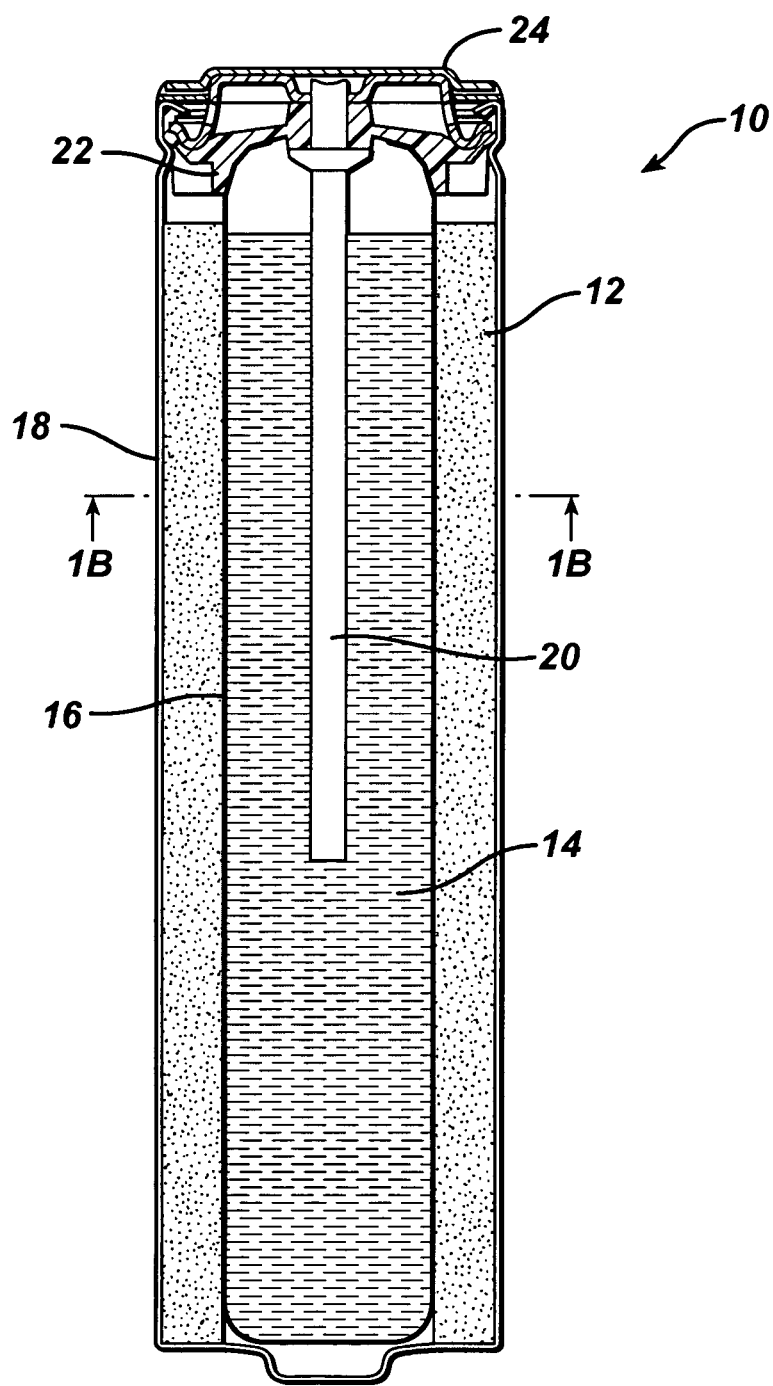
FIG. 1A is a side cross-sectional view of an embodiment of a battery.
Figure 1B:
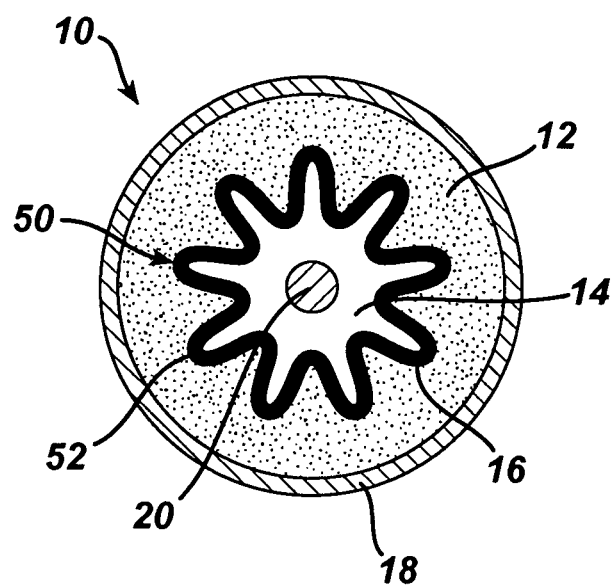
FIG. 1B is a transverse cross-sectional view of the battery of FIG. 1A, taken along line 1B-1B.

Referring to FIGS. 1A and 1B, a battery or electrochemical cell 10 has a cylindrical housing 18 containing a cathode 12, an anode 14, a separator 16 between cathode 12 and anode 14, and a current collector 20. As FIG. 1B shows, cathode 12 has relatively recessed portions 52 (as shown, grooves) on its interior surface 50. Separator 16 conforms to grooves 52, and anode 14 and current collector 20 occupy the remaining space. Cathode 12 includes a cathode active material, and anode 14 includes an anode active material. Battery 10 also includes a seal 22 and a metal end cap 24, which, along with current collector 20, serve as the negative terminal for the battery. Cathode 12 is in contact with housing 18, and the positive terminal of battery 10 is at the end of the battery opposite from the negative terminal. An electrolyte is dispersed throughout battery 10.

FIG. 2A shows an apparatus 100 that can be used to form cathode 12 of battery 10. Apparatus 100 includes a punch 110, cathode pellets 120, and housing 18.

Figure 2B:
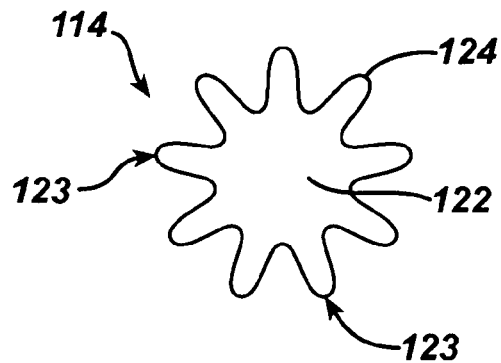
FIG. 2B is a transverse cross-sectional view of the apparatus of FIG. 2A, taken along line 2B-2B.

Punch 110 includes a handle 112, a mandrel 114, and a sleeve 116 (FIG. 2D) that slidably receives mandrel 114. Referring also now to FIG. 2B, mandrel 114 has a mandrel body 122 and relatively raised portions 124 (as shown, lobes). Lobes 124 have rounded surfaces 123, which can, for example, lead to good flow of material (e.g., electrode material) around lobes 124, and/or can reduce the likelihood of material (e.g., electrode material) scaling upon contacting lobes 124. Mandrel body 122 and/or lobes 124 can include, for example, a metal, a metal alloy (e.g., steel), a ceramic, a polymer, and/or a carbide. In some embodiments, mandrel body 122 and/or lobes 124 can include yttrium-stabilized zirconia. While mandrel 114 is shown with multiple lobes, in certain embodiments, a mandrel can include just one lobe. Mandrels that include multiple lobes can include, for example, two lobes, three lobes, four lobes, five lobes, six lobes, seven lobes, eight lobes, nine lobes, 10 lobes, or more than 10 lobes. The number of lobes on mandrel 114 can be equal to the number of grooves in cathode 12. In some embodiments, as the number of lobes on mandrel 114 decreases, each individual lobe can increase in size (e.g., surface area). As a lobe on a mandrel increases in surface area, the flow of material around that lobe may become enhanced (e.g., by becoming smoother). This can, for example, result in the formation of a relatively uniform cathode exhibiting good electrochemical performance.

Figure 2C:
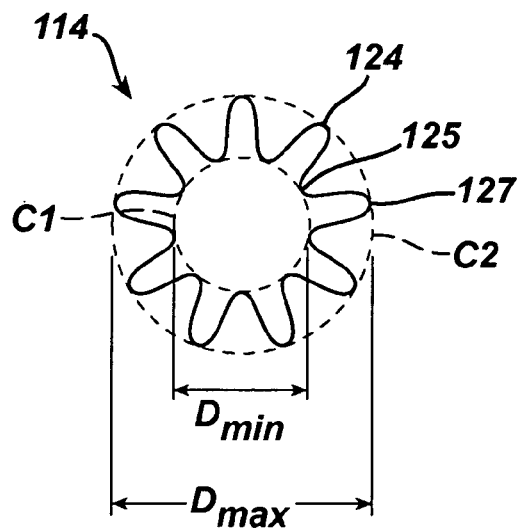
FIG. 2C is a transverse cross-sectional view of the apparatus of FIG. 2A, taken along line 2C-2C.
Figure 2D:
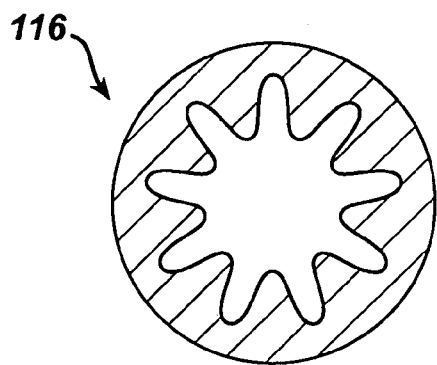
FIG. 2D is a transverse cross-sectional view of the apparatus of FIG. 2A, taken along line 2D-2D.

Referring to FIG. 2C, the transverse cross-section of mandrel 114 has a minimum dimension $D_{min}$ and a maximum dimension $D_{max}$. Minimum dimension $D_{min}$ is equal to the diameter of circle C1, which is tangent to the valleys 125 of lobes 124. Maximum dimension $D_{max}$ is equal to the diameter of circle C2, which is circumscribed around the transverse cross-section of mandrel 114, such that circle C2 is tangent to the peaks 127 of lobes 124. The value of minimum dimension $D_{min}$ and/or the value of maximum dimension $D_{max}$ can be selected, for example, based on the dimensions of housing 18.

In certain embodiments, minimum dimension $D_{min}$ can be at most about 80 millimeters (e.g., at most about 50 millimeters, at most about 34 millimeters, at most about 21.5 millimeters, at most about 21 millimeters, at most about 10 millimeters, at most about two millimeters, at most about one millimeter), and/or at least 0.0001 millimeter (e.g., at least about one millimeter, at least about two millimeters, at least about 10 millimeters, at least about 21 millimeters, at least about 21.5 millimeters, at least about 34 millimeters, at least about 50 millimeters). In some embodiments, minimum dimension $D_{min}$ can be from 0.0001 millimeter to about 34 millimeters (e.g., from about two millimeters to about 31 millimeters). In certain embodiments (e.g., certain embodiments in which battery 10 is a D battery), minimum dimension $D_{min}$ can be about 21 millimeters.

Alternatively or additionally, maximum dimension $D_{max}$ can be at most about 80 millimeters (e.g., at most about 34 millimeters, at most about 32 millimeters, at most about 23 millimeters, at most about 22.5 millimeters, at most about 10 millimeters, at most about two millimeters, at most about one millimeter), and/or at least 0.001 millimeter (e.g., at least about one millimeter, at least about two millimeters, at least about 10 millimeters, at least about 22.5 millimeters, at least about 23 millimeters, at least about 32 millimeters). For example, maximum dimension $D_{max}$ can be from 0.001 millimeter to about 32 millimeters (e.g., from about three millimeters to about 25 millimeters). In some embodiments (e.g., some embodiments in which battery 10 is a D battery), maximum dimension $D_{max}$ can be about 22.6 millimeters.

In some embodiments, the difference between maximum dimension $D_{max}$ and minimum dimension $D_{min}$ can be at least 0.0001 millimeter (e.g., at least about 0.5 millimeter, at least about one millimeter, at least about 1.5 millimeters, at least about 10 millimeters, at least about 15 millimeters, at least about 25 millimeters), and/or at most about 35 millimeters (e.g., at most about 25 millimeters, at most about 15 millimeters, at most about 10 millimeters, at most about 1.5 millimeters, at most about one millimeter, at most about 0.5 millimeter). In certain embodiments, the difference between maximum dimension $D_{max}$ and minimum dimension $D_{min}$ can be from 0.0001 millimeter to about 34 millimeters (e.g., from about one millimeter to about 10 millimeters).

In some embodiments, the average of maximum dimension $D_{max}$ and minimum dimension $D_{min}$ can be used to determine an appropriate amount of material to be used in forming a component or components (e.g., cathode 12, anode 14) of battery 10.

Mandrel 114 can be formed, for example, by grinding the mandrel material into the shape of mandrel 114 (e.g., using a centerless grind). In some embodiments, mandrel 114 can be formed by using a lathe and/or laser to cut or ablate sections of the mandrel material (e.g., to form lobes 124). Alternatively or additionally, mandrel 114 can be formed by etching the mandrel material (e.g., using photochemical etching). In some embodiments in which mandrel 114 is formed of ceramic, mandrel 114 can be formed by machining a solid block of ceramic material. In certain embodiments, mandrel 114 can be formed by polymeric or metal injection molding. In some embodiments, mandrel 114 can be formed by one or more machining methods (e.g., electron discharge machining (EDM), 3D machining, 2D machining). In certain embodiments (e.g., certain embodiments in which mandrel 114 is formed of steel), mandrel 114 can be formed by forging. In some embodiments (e.g., some embodiments in which mandrel 114 is formed of steel), mandrel 114 can be formed using a forging die. Lobes 124 can be integrally formed with mandrel body 122, or can be formed separately and then attached (e.g., welded, fastened) to mandrel body 122. In some embodiments, at least one lobe can be attached to the mandrel body, while at least one other lobe can be integrally formed with the mandrel body.

Referring to FIG. 2A, cathode pellets 120 are cylindrical and define holes 121. Each cathode pellet 120 has a height $H_{120}$, an inner diameter $ID_{120}$, and an outer diameter $OD_{120}$.

In some embodiments, height $H_{120}$ can be from about one millimeter to about 80 millimeters (e.g., from about ten millimeters to about 50 millimeters, from about 12 millimeters to about 30 millimeters, from about 13.5 millimeters to about 18.5 millimeters).

In certain embodiments, inner diameter $ID_{120}$ can be at least 0.001 millimeter (e.g., at least about 0.1 millimeter, at least about one millimeter, at least about 10 millimeters, at least about 21.5 millimeters), and/or at most about 24 millimeters (e.g., at most about 21.5 millimeters, at most about 10 millimeters, at most about one millimeter, at most about 0.1 millimeter). For example, inner diameter $ID_{120}$ can be from about 0.001 millimeter to about 24 millimeters (e.g., from about 21.5 millimeters to about 24 millimeters, from about 22 millimeters to about 23 millimeters). Alternatively or additionally, outer diameter $OD_{120}$ can be at least about one millimeter (e.g., at least about 10 millimeters, at least about 20 millimeters, at least about 30 millimeters), and/or at most about 35 millimeters (e.g., at most about 30 millimeters, at most about 20 millimeters, at most about 10 millimeters). For example, outer diameter $OD_{120}$ can be from about 30 millimeters to about 32 millimeters. In some embodiments, outer diameter $OD_{120}$ can be about 32.4 millimeters. The difference between outer diameter $OD_{120}$ and inner diameter $ID_{120}$ can be, for example, from 0.0001 millimeter to about 20 millimeters (e.g., from about one millimeter to about 15 millimeters).

Alternatively or additionally, the transverse cross-section of a hole 121 in a cathode pellet 120 can have an area of, for example, at least 0.000001 square millimeter (e.g., at least about 0.1 square millimeter, at least about one square millimeter, at least about 10 square millimeters, at least about 100 square millimeters, at least about 500 square millimeters, at least about 850 square millimeters, at least about 1,000 square millimeters, at least about 3,000 square millimeters, at least about 5,000 square millimeters), and/or at most about 7,500 square millimeters (e.g., at most about 5,000 square millimeters, at most about 3,000 square millimeters, at most about 1,000 square millimeters, at most about 850 square millimeters, at most about 500 square millimeters, at most about 100 square millimeters, at most about 10 square millimeters, at most about one square millimeter, at most about 0.1 square millimeter). For example, the transverse cross-section of a hole 121 in a cathode pellet 120 can have an area of from about one square millimeter to about 850 square millimeters.

Each of height $H_{120}$, inner diameter $ID_{120}$, and/or outer diameter $OD_{120}$ can be adjusted in accordance with adjustments made to one or more of the other dimensions. For example, in some embodiments, if height $H_{120}$ is decreased, then inner diameter $ID_{120}$ can be decreased, and/or outer diameter $OD_{120}$ can be increased, by an amount that will allow cathode pellet 120 to maintain its weight.

In some embodiments, a single cathode pellet 120 can have a weight of from about 0.05 gram to about 50 grams (e.g., from about one gram to about 50 grams, from about one gram to about 25 grams, from about 22 grams to about 25 grams, from about 23 grams to about 24 grams). For example, in certain embodiments, a single cathode pellet 120 can have a weight of about 18.4 grams, about 23.3 grams, about 23.9 grams, or about 24.5 grams. Alternatively or additionally, a single cathode pellet can have a density of from about three grams per cubic centimeter to about four grams per cubic centimeter (e.g., about 3.5 grams per cubic centimeter).

Cathode pellets 120 (and, therefore, cathode 12) include a cathode active material, a conductive aid, and a binder. The electrolyte also is dispersed through cathode pellets 120. The weight percentages provided herein with respect to components of cathode pellets 120 are determined after the electrolyte has been dispersed through cathode pellets 120.

In some embodiments, the cathode active material can be a manganese oxide, such as manganese dioxide ($MnO_2$). The manganese dioxide can be electrolytically-synthesized $MnO_2$ (EMD), chemically-synthesized $MnO_2$ (CMD), or a blend of EMD and CMD. Distributors of manganese dioxides include Kerr-McGee Corp. (manufacturer of, e.g., Trona D and high-power EMD), Tosoh Corp., Delta Manganese, Delta EMD Ltd., Mitsui Chemicals, ERACHEM, and JMC. In certain embodiments, cathode pellets 120 can include from about 80 percent to about 88 percent by weight (e.g., from about 82 percent to about 86 percent by weight) manganese dioxide (e.g., EMD).

Examples of other cathode active materials include copper oxides (e.g., cupric oxide (CuO), cuprous oxide ($Cu_2O$)); copper hydroxides (e.g., cupric hydroxide ($Cu(OH)_2$), cuprous hydroxide (Cu(OH))); cupric iodate ($Cu(IO_3)_2$); $AgCuO_2$; $LiCuO_2$; $Cu(OH)(IO_3)$; $Cu_2H(IO_6)$; copper-containing metal oxides or chalcogenides; copper halides (e.g., $CuCl_2$); and/or copper manganese oxides (e.g., $Cu(MnO_4)_2$). The copper oxides can be stoichiometric (e.g., CuO) or non-stoichiometric (e.g., $CuO_x$, where $0.5 \leq x \leq 1.5$). Another example of a cathode active material is $Cu_6InO_8Cl$. In some embodiments, cathode pellets 120 can include multiple (e.g., two, three) cathode active materials. Cathode active materials are described, for example, in Eylem et al., U.S. Patent Application Publication No. US 2005/0136328 A1, published on Jun. 23, 2005, and entitled "Battery Cathode".

The conductive aid can increase the electronic conductivity of cathode pellets 120. An example of a conductive aid is carbon particles. The carbon particles can be any of the conventional carbon particles used in cathodes. The carbon particles can be, for example, graphite particles. Graphite particles that are used in cathode 12 can be any of the graphite particles used in cathodes. The particles can be synthetic, non-synthetic, or a blend of synthetic and non-synthetic, and they can be expanded or non-expanded. In certain embodiments, the graphite particles are non-synthetic, non-expanded graphite particles. In such embodiments, the graphite particles can have an average particle size of less than about 20 microns (e.g., from about two microns to about 12 microns, from about five microns to about nine microns), as measured using a Sympatec HELIOS analyzer. Graphite particles can be obtained from, for example, Brazilian Nacional de Grafite (Itapecirica, MG Brazil (MP-0702X)) or Chuetsu Graphite Works, Ltd. (Chuetsu grades WH-20A and WH-20AF) of Japan. Cathode pellets 120 may include for example, from about three percent to about nine percent (e.g., from about four percent to about seven percent) carbon particles by weight. In some embodiments, cathode pellets 120 can include from about four percent to about nine percent (e.g., from about four percent to about 6.5 percent) graphite particles by weight.

Another example of a conductive aid is carbon fibers, such as those described in commonly assigned Luo et al., U.S. Pat. No. 6,858,349; and in Anglin, U.S. Patent Application Publication No. US 2002/0172867 A1, published on Nov. 21, 2002, and entitled "Battery Cathode". In some embodiments, cathode pellets 120 can include less than about two percent by weight (e.g., less than about 1.5 percent by weight, less than about one percent by weight, less than about 0.75 percent by weight, less than about 0.5 percent by weight), and/or more than about 0.1 percent by weight (e.g., more than about 0.2 percent by weight, more than about 0.3 percent by weight, more than about 0.4 percent by weight, more than about 0.45 percent by weight) carbon fibers.

In certain embodiments, cathode pellets 120 can include from about one percent by weight to about 10 percent by weight of one or more total conductive aids.

Examples of binders include polyethylene powders, polyacrylamides, Portland cement and fluorocarbon resins, such as polyvinylidenefluoride (PVDF) and polytetrafluoroethylene (PTFE). An example of a polyethylene binder is sold under the trade name Coathylene HA-1681 (available from Hoechst). Cathode pellets 120 may include, for example, up to about two percent binder by weight (e.g., up to about one percent binder by weight). In certain embodiments, cathode pellets 120 can include from about 0.1 percent to about two percent (e.g., from about 0.1 percent to about one percent) binder by weight.

Cathode pellets 120 can include other additives. Additives are disclosed, for example, in Mieczkowska et al., U.S. Pat. No. 5,342,712. In some embodiments, cathode pellets 120 can include titanium dioxide ($TiO_2$). In certain embodiments, cathode pellets 120 can include from about 0.1 percent to about two percent (e.g., from about 0.2 percent to about two percent) $TiO_2$ by weight.

The electrolyte that is dispersed through cathode pellets 120 (and/or the electrolyte used in the rest of battery 10) can be any of the electrolytes used in batteries. In some embodiments, cathode pellets 120 can include from about five percent to about eight percent (e.g., from about six percent to about seven percent) electrolyte by weight. The electrolyte can be aqueous or non-aqueous. An aqueous electrolyte can be an alkaline solution, such as an aqueous hydroxide solution (e.g., LiOH, NaOH, KOH), or a mixture of hydroxide solutions (e.g., NaOH/KOH). For example, the aqueous hydroxide solution can include from about 33 percent by weight to about 40 percent by weight of the hydroxide material, such as about 9N KOH (about 37 percent by weight KOH). In some embodiments, the electrolyte can also include up to about four percent by weight (e.g., about two percent by weight) of zinc oxide.

The electrolyte can include other additives. As an example, the electrolyte can include a soluble material (e.g., an aluminum material) that reduces (e.g., suppresses) the solubility of the cathode active material in the electrolyte. In certain embodiments, the electrolyte can include one or more of the following: aluminum hydroxide, aluminum oxide, alkali metal aluminates, aluminum metal, alkali metal halides, alkali metal carbonates, or mixtures thereof. Electrolyte additives are described, for example, in Eylem et al., U.S. Patent Application Publication No. US 2004/0175613 A1, published on Sep. 9, 2004, and entitled "Battery".

Housing 18 can be any housing commonly used in batteries. In some embodiments, housing 18 can include an inner metal wall and an outer electrically non-conductive material such as heat-shrinkable plastic. Optionally, a layer of conductive material can be disposed between the inner wall and cathode 12. The layer may be disposed along the inner surface of the inner wall, along the circumference of cathode 12, or both. This conductive layer can be formed, for example, of a carbonaceous material (e.g., graphite). Such materials include, for example, LB1000 (Timcal), Eccocoat 257 (W.R. Grace & Co.), Electrodag 109 (Acheson Colloids Co.), Electrodag 112 (Acheson), Varniphite 5000 (Nippon), and EB0005 (Acheson). Methods of applying the conductive layer are disclosed in, for example, Canadian Patent No. 1,263,697.

FIGS. 3A-3C illustrate a method for forming cathode 12 using apparatus 100 of FIG. 2A.

As shown in FIG. 3A, cathode pellets 120 are loaded into housing 18 to form a stack 200 of cathode pellets having a height $H_{200}$. While FIG. 3A shows three cathode pellets 120 loaded into housing 18, in certain embodiments, a different number of cathode pellets 120 can be loaded into housing 18. In some embodiments, at least one (e.g., at least two, at least three, at least four, at least five, at least six, at least seven, at least eight, at least nine, at least 10) cathode pellet 120 can be loaded into housing 18. In certain embodiments, as the number of cathode pellets 120 that are loaded into housing 18 increases, one or more of the dimensions of the cathode pellets can decrease (e.g., to maintain a relatively consistent height $H_{200}$ and/or weight of stack 200). In some embodiments, a smaller pellet may be more easily and/or accurately formed than a larger pellet.

In some embodiments, stack 200 can have a height $H_{200}$ of at least about 0.01 millimeter and/or at most about 80 millimeters (e.g., from about ten millimeters to about 70 millimeters, from about 30 millimeters to about 60 millimeters, from about 54 millimeters to about 56 millimeters). In certain embodiments, $H_{200}$ can be selected such that stack 200 is shorter than housing 18. For example, stack 200 can be at least about 0.01 inch (e.g., about 0.0625 inch) shorter than housing 18.

In some embodiments, stack 200 can weigh at least about 0.5 gram (e.g., at least about one gram, at least about 10 grams, at least about 25 grams, at least about 50 grams, at least about 75 grams) and/or at most about 100 grams (e.g., at most about 75 grams, at most about 50 grams, at most about 25 grams, at most about 10 grams, at most about one gram). For example, in certain embodiments, stack 200 can weigh about 73.5 grams.

Figure 3D:
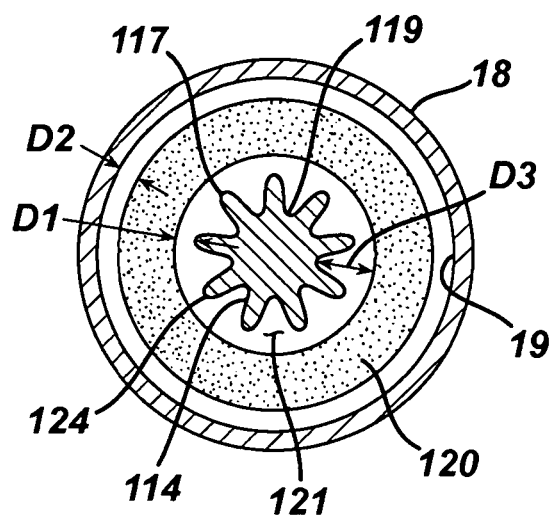
FIG. 3D is a transverse cross-sectional view of the apparatus shown in FIG. 3B, taken along line 3D-3D.

Initially, mandrel 114 is disposed within sleeve 116. However, at the start of the cathode formation process, mandrel 114 is pushed out of sleeve 116 in the direction of arrow A and, as shown in FIG. 3B, punch 110 is inserted into housing 18. Punch 110 is inserted into housing 18 until surface 202 of sleeve 116 contacts the top cathode pellet 120 of stack 200. As punch 110 is inserted into housing 18, mandrel 114 enters holes 121 of cathode pellets 120. In some embodiments, inner diameter $ID_{120}$ of cathode pellets 120 can be selected to provide for maximum insertion of mandrel 114 into holes 121 of cathode pellets 120. Lobes 124 of mandrel 114 do not substantially contact cathode pellets 120 when mandrel 114 first enters holes 121 of cathode pellets 120. Rather, and referring to FIG. 3D, there is a distance D1 between cathode pellets 120 and the peaks 117 of lobes 124. Additionally, there is a distance D3 between cathode pellets 120 and the valleys 119 of lobes 124. Furthermore, cathode pellets 120 do not substantially contact housing 18 at this point, either. Rather, there is a distance D2 between cathode pellets 120 and interior surface 19 of housing 18.

In some embodiments, distance D1 can be at least 0.0001 millimeter (e.g., at least about 0.01 millimeter, at least about 0.05 millimeter, at least about 0.08 millimeter, at least about 0.1 millimeter, at least 0.127 millimeter, at least about 0.2 millimeter, at least about 0.3 millimeter, at least about 0.5 millimeter, at least about one millimeter, at least about two millimeters), and/or at most about five millimeters (e.g., at most about two millimeters, at most about one millimeter, at most about 0.5 millimeter, at most about 0.3 millimeter, at most about 0.2 millimeter, at most 0.127 millimeter, at most about 0.1 millimeter, at most about 0.08 millimeter, at most about 0.05 millimeter, at most about 0.01 millimeter). For example, distance D1 can be from about 0.25 millimeter to about 0.29 millimeter (e.g., about 0.254 millimeter).

Alternatively or additionally, distance D3 can be at least about 0.01 millimeter (e.g., at least about 0.1 millimeter, at least 0.127 millimeter, at least about 0.5 millimeter, at least about one millimeter, at least about five millimeters, at least about 10 millimeters), and/or at most about 15 millimeters (e.g., at most about 10 millimeters, at most about five millimeters, at most about one millimeter, at most about 0.5 millimeter, at most 0.127 millimeter, at most about 0.1 millimeter). For example, distance D3 can be about 0.0254 millimeter.

In certain embodiments, distance D2 can be at least 0.0001 millimeter (e.g., at least about 0.01 millimeter, at least about 0.05 millimeter, at least about 0.08 millimeter, at least about one millimeter, at least about two millimeters, at least about three millimeters), and/or at most about five millimeters (e.g., at most about three millimeters, at most about two millimeters, at most about one millimeter, at most about 0.08 millimeter, at most about 0.05 millimeter, at most about 0.01 millimeter). For example, distance D2 can be from about 0.25 millimeter to about 0.4 millimeter (e.g., about 0.254 millimeter).

Referring to FIG. 3C, after punch 110 has been inserted into housing 18, pressure is applied to sleeve 116. This pressure causes sleeve 116 to push down on stack 200 of cathode pellets 120, thereby compacting the stack. In some embodiments, the pressure that is applied to sleeve 116 can be at least one psi (e.g., at least about 350 psi, at least about 500 psi, at least about 750 psi, at least about 1,000 psi, at least about 2,000 psi, at least about 3,000 psi, at least about 4,000 psi), and/or at most about 5,000 psi (e.g., at most about 4,000 psi, at most about 3,000 psi, at most about 2,000 psi, at most about 1,000 psi, at most about 750 psi, at most about 500 psi, at most about 350 psi). For example, the pressure that is applied to sleeve 116 can be from about 350 psi to about 500 psi.

Figure 3E:
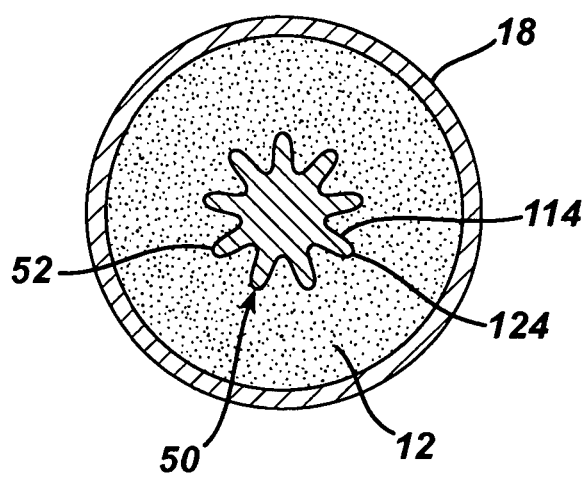
FIG. 3E is a transverse cross-sectional view of the apparatus shown in FIG. 3C, taken along line 3E-3E.

Because sleeve 116 pushes down on stack 200, cathode pellets 120 decrease in height and flow into the remaining space in housing 18. Thus, cathode pellets 120 flow toward both mandrel 114 and interior surface 19 (FIG. 3D) of housing 18. Furthermore, cathode pellets 120 flow together, such that they no longer define distinct cathode pellets. FIG. 3E shows the result of this process, which is cathode 12, having grooves 52 on its interior surface 50.

Figure 3F:
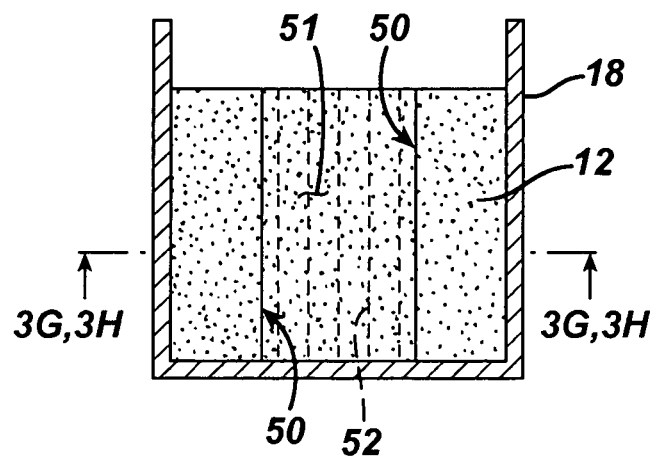
FIG. 3F is a side cross-sectional view of an embodiment of a cathode made by the method of FIGS. 3A-3C.
Figure 3G:
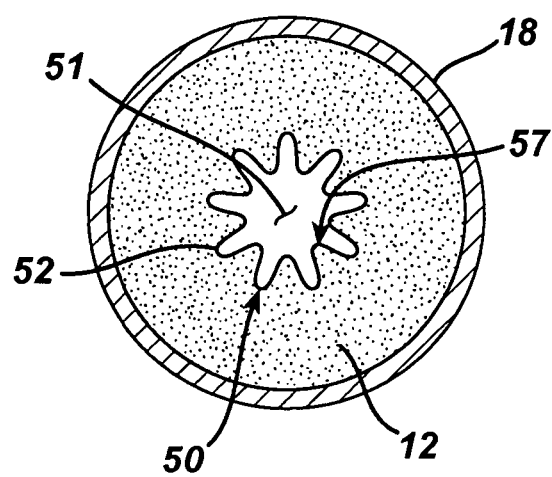
FIG. 3G is a transverse cross-sectional view of the cathode of FIG. 3F, taken along line 3G-3G.
Figure 3H:
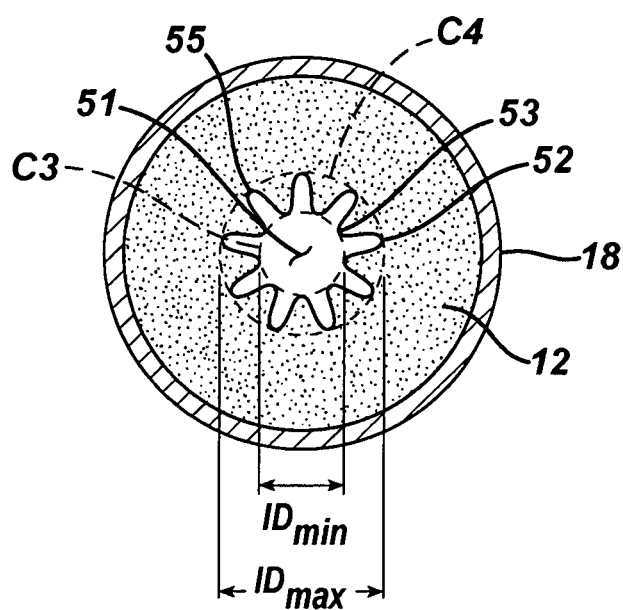
FIG. 3H is a transverse cross-sectional view of the cathode of FIG. 3F, taken along line 3H-3H.

FIG. 3H shows cathode 12 when mandrel 114 has been removed from housing 18, leaving a space 51 in cathode 12. As shown in FIG. 3H, the transverse cross-section of cathode 12 has an inner dimension $ID_{min}$ that is equal to the diameter of circle C3, which is tangent to the peaks 53 of grooves 52. In some embodiments, inner dimension $ID_{min}$ can be at least 0.001 millimeter and/or at most about 34 millimeters (e.g., from about one millimeter to about 30 millimeters, from about ten millimeters to about 25 millimeters, from about 21 millimeters to about 22 millimeters). As FIG. 3H shows, the transverse cross-section of cathode 12 also has an inner dimension $ID_{max}$. Inner dimension $ID_{max}$ is equal to the diameter of circle C4, which is circumscribed around the transverse cross-section of space 51, such that circle C4 is tangent to the valleys 55 of grooves 52. In certain embodiments, inner dimension $ID_{max}$ can be at least 0.0001 millimeter and/or at most about 34 millimeters (e.g., from about three millimeters to about 32 millimeters, from about 20.5 millimeters to about 23 millimeters).

In some embodiments, cathode 12 can have a height $H_{12}$ (FIG. 3C) of at least about 0.01 millimeter and/or at most about 80 millimeters (e.g., from about one millimeter to about 60 millimeters, from about ten millimeters to about 50 millimeters, from about 45 millimeters to about 47.5 millimeters); In certain embodiments, cathode 12 can have a height $H_{12}$ of about 46.7 millimeters, about 47 millimeters, about 48.3 millimeters, or about 48.8 millimeters.

Cathode 12 may have substantially the same density as cathode pellets 120, or may have a different density from cathode pellets 120. Cathode 12 can have a density of, for example, from about three grams per cubic centimeter to about four grams per cubic centimeter (e.g., about 3.5 grams per cubic centimeter). In certain embodiments, the density of the cathode material may be maintained during compaction by balancing the flow of cathode pellets 120 (toward mandrel 114 and interior surface 19 of housing 18) against the decrease in height of cathode pellets 120.

Referring back to FIGS. 3F and 3G, as noted above, mandrel 114 is removed from housing 18 after cathode 12 has been formed. When mandrel 114 is removed, it leaves space 51 in cathode 12. Space 51 is defined by an interior surface 57 of cathode 12. In some embodiments, interior surface 57 can have a larger surface area (e.g., at least about two percent larger, at least about five percent larger, at least about 10 percent larger, at least about 15 percent larger, at least about 20 percent larger) than an interior surface of a cathode that is not grooved. After mandrel 114 has been removed from housing 18, separator 16 and anode 12 can be added into space 51. After all of the cell contents have been added into housing 18, the cell can be closed by crimping the housing edge over an edge of the end cap assembly (which includes seal 22, metal end cap 24, and current collector 20) and radially compressing the housing around the assembly to provide a tight seal, thereby forming battery 10.

In some embodiments, mandrel 114 can experience less wear during the compaction of cathode pellets 120 than a mandrel that does not include lobes (e.g., a cylindrical mandrel). Without wishing to be bound by theory, it is believed that mandrel 114 can experience less wear because the onset of frictional forces as a result of contact between mandrel 114 and cathode pellets 120 can be delayed, and/or because the frictional forces can occur for a relatively short period of time.

Anode 14 can be formed of any of the zinc materials used in battery anodes. For example, anode 14 can be a zinc slurry or a zinc gel that includes zinc metal particles, a gelling agent, and/or minor amounts of additives, such as gassing inhibitor. In addition, a portion of the electrolyte can be dispersed throughout the anode. In certain embodiments, battery 10 can include from about 0.05 gram to about 50 grams (e.g., from about 20 grams to about 50 grams, about 40 grams, about 41 grams) of anode 14.

The zinc particles can be any of the zinc particles used in gel anodes. Examples of zinc particles include those described in Durkot et al., U.S. Pat. No. 6,284,410, and in Durkot et al., U.S. Pat. No. 6,521,378. In certain embodiments, anode 14 can include spherical zinc particles. Spherical zinc particles are described, for example, in Costanzo et al., U.S. Patent Application Publication No. US 2004/0258995 A1, published on Dec. 23, 2004, and entitled "Anode for Battery". The zinc particles can be a zinc alloy (e.g., containing a few hundred parts per million of indium and bismuth). Anode 14 may include, for example, from about 67 percent to about 80 percent zinc particles by weight.

Examples of gelling agents include polyacrylic acids, grafted starch materials, salts of polyacrylic acids, polyacrylates, carboxymethylcellulose or combinations thereof. Examples of polyacrylic acids include Carbopol 940 and 934 (available from Noveon Inc.) and Polygel 4P (available from 3V). An example of a grafted starch material is Waterlock A221 (available from Grain Processing Corporation, Muscatine, Iowa). An example of a salt of a polyacrylic acid is Alcosorb G1 (available from Ciba Specialties). Anode 14 may include, for example, from about 0.1 percent to about one percent gelling agent by weight.

Gassing inhibitors can be inorganic materials, such as bismuth, tin, lead and indium. Alternatively, gassing inhibitors can be organic compounds, such as phosphate esters, ionic surfactants or nonionic surfactants. Examples of ionic surfactants are disclosed in, for example, Chalilpoyil et al., U.S. Pat. No. 4,777,100.

Current collector 20 can be made of a metal or a metal alloy, such as brass. Seal 22 can be made of, for example, nylon.

In some embodiments, battery 10 can include a hydrogen recombination catalyst to lower the amount of hydrogen gas that may be generated in the cell by anode 14 (e.g., when anode 14 includes zinc). Hydrogen recombination catalysts are described, for example, in Davis et al., U.S. Pat. No. 6,500,576, and in Kozawa, U.S. Pat. No. 3,893,870. Alternatively or additionally, battery 10 can be constructed to include pressure-activated valves or vents, such as those described in Tomantschger et al., U.S. Pat. No. 5,300,371.

Weight percentages of battery components provided herein are determined after the electrolyte solution has been dispersed in the battery.

Battery 10 can be a primary electrochemical cell or a secondary electrochemical cell. Primary cells are meant to be discharged (e.g., to exhaustion) only once, and then discarded. Primary cells are not intended to be recharged. Primary cells are described, for example, in David Linden, *Handbook of Batteries* (McGraw-Hill, 2d ed. 1995). Secondary electrochemical cells can be recharged for many times (e.g., more than fifty times, more than a hundred times, or more). In some embodiments, secondary cells can include relatively robust separators, such as separators that have many layers and/or separators that are relatively thick. Secondary cells can also be designed to accommodate for changes, such as swelling, that can occur in the cells. Secondary cells are described, for example, in Falk & Salkind, "Alkaline Storage Batteries", John Wiley & Sons, Inc. 1969; and in Virloy et al., U.S. Pat. No. 345,124.

Figure 4A:
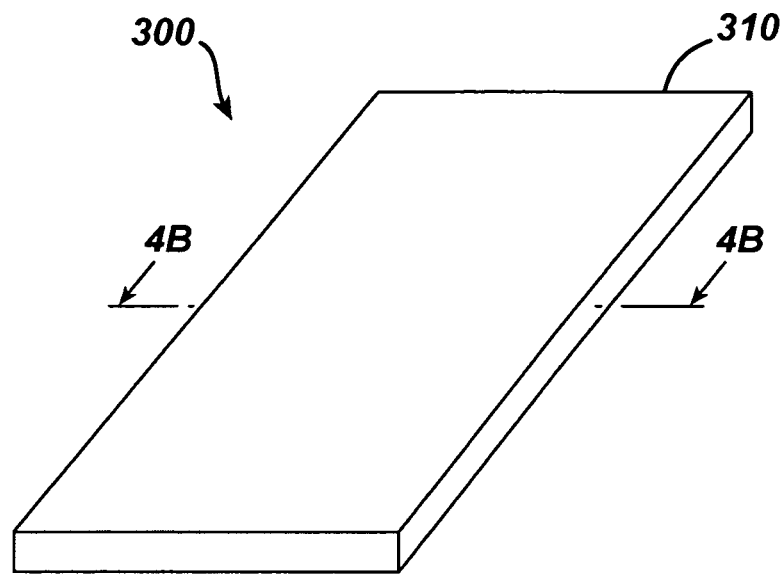
FIG. 4A is a perspective view of an embodiment of a battery.
Figure 4B:
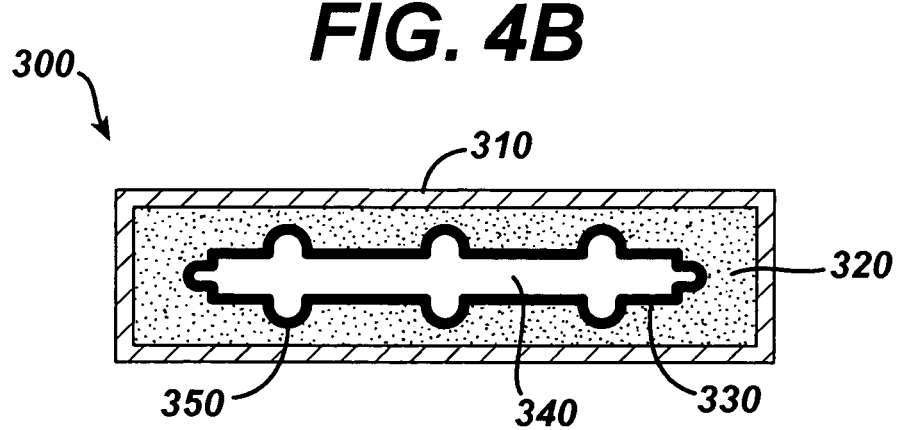
FIG. 4B is a cross-sectional view of the battery of FIG. 4A, taken along line 4B-4B.
Figure 5:
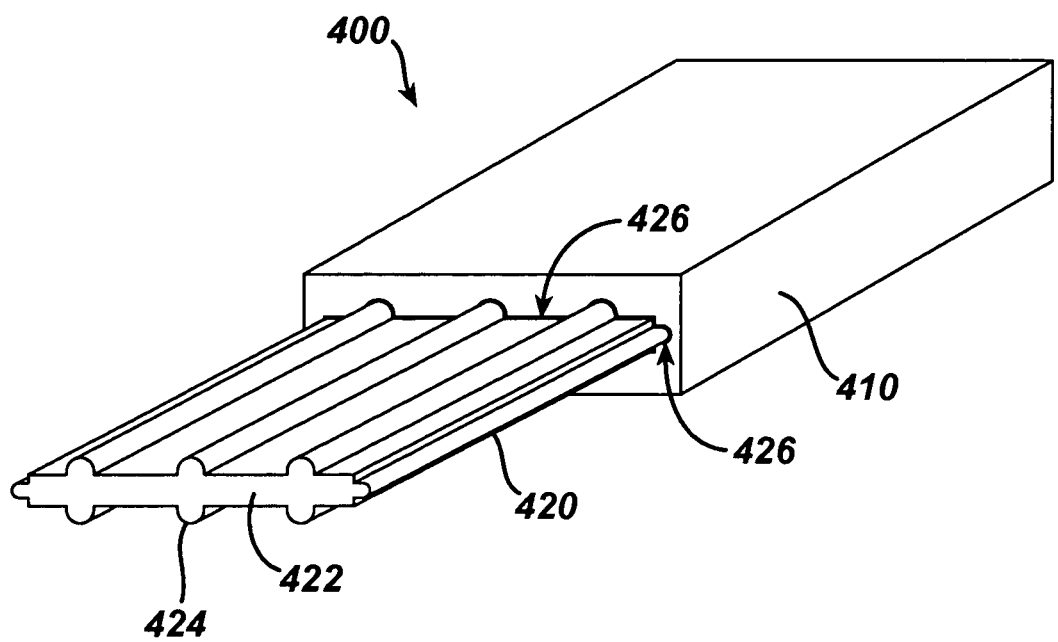
FIG. 5 is a perspective view of an embodiment of an apparatus for forming an electrode.

Battery 10 can be, for example, a AA, AAA, AAAA, C, or D battery. While battery 10 is cylindrical, in some embodiments, a battery can be non-cylindrical. For example, a battery can be a coin cell, a button cell, a wafer cell, or a racetrack-shaped cell. In some embodiments, a battery can be prismatic. For example, FIGS. 4A and 4B show a prismatic battery 300 that includes a housing 310, as well as a cathode 320, a separator 330, and an anode 340 disposed within housing 310. As shown in FIG. 4B, cathode 320 includes grooves 350. FIG. 5 shows a punch 400 that can be used to make cathodes such as cathode 320. As shown, punch 400 includes a sleeve 410 that is slidably disposed around a mandrel 420. Mandrel 420 includes a mandrel body 422 and lobes 424. As shown in FIG. 5, sleeve 410 includes an opening 426 in which mandrel 420 is slidably disposed. Opening 426 is shaped to conform to both mandrel body 422 and lobes 424. This conformation of opening 426 to mandrel body 422 and lobes 424 can, for example, limit the likelihood of electrode material coming between mandrel 420 and sleeve 410 when punch 400 is in use.

The following examples are meant to be illustrative and not to be limiting.

EXAMPLES

D-sized batteries were assembled with dimensions according to ANSI/IEC C18.1M-1992.

Each battery included a cathode formed by the compaction process described above with reference to FIGS. 3A-3C. The cathode pellets that were used in making the cathodes were formed of a cathode composition that included about 84 percent by weight EMD (from either Delta EMD Ltd. or ERACHEM), about one percent by weight $TiO_2$ (from Kronos), about one percent by weight polyacrylamide (Nalco 2383 Floculant, from Nalco), about six percent by weight 40/2 KOH (from Oxychem, Alabama), and about six percent by weight graphite (NdG44, from Brazilian Nacional de Graphite LTDA).

Each cathode pellet that was formed from the cathode composition had a weight of about 23.5 grams, a height of about 18 millimeters, an inner diameter of about 23 millimeters, an outer diameter of about 32.2 millimeters, and a density of about 3.4 grams per cubic centimeter. Each cathode pellet was formed by applying a force of about 30,000 pounds to about 23.5 grams of the cathode composition (per cathode pellet), using a Vector Rotary Pellet Press (from Vector, Marion, Iowa).

Three cathode pellets were added into each battery can and were compacted and grooved using a punch with a sleeve (made of D2 steel) and a mandrel (made of ceramic). During compaction, a pressure of about 400 psi was applied to the sleeve of the punch. The resulting cathodes had a height of about 45.87 millimeters, a minimum inner diameter of about 23.44 millimeters, and a maximum inner diameter of about 25.03 millimeters.

After the cathode pellets had been compacted to form cathodes, a separator (PA236/D236, from PDM, Quimperle, Cedex, France) and about 39 grams of a zinc slurry were added into each battery can. The zinc slurry included zinc metal particles, a gelling agent, and additives, including a gassing inhibitor. Additionally, either 9.6 grams or 10 grams of 40/2 KOH (Oxychem, Alabama) were added into the battery can as an electrolyte.

Six different groups of batteries (samples 1-6) were produced. One thousand batteries were produced in each group. The batteries of samples 1 and 4 had cathodes that were formed using a mandrel that did not have any lobes. The non-lobed mandrel had a transverse cross-section with a diameter of about 21.36 millimeters. The batteries of samples 2, 3, 5, and 6 had cathodes that were formed using a lobed mandrel. The lobed mandrel had nine lobes, and had a transverse cross-section with a minimum dimension of about 21.095 millimeters and a maximum dimension of about 22.688 millimeters. Additionally, the batteries of samples 1, 2, and 5 had a graphite coating on the interior surface of their battery housings, while the batteries of samples 3, 4, and 6 did not. Finally, the batteries of samples 1, 2, 3, and 4 had 9.6 grams of KOH, while samples 5 and 6 had 10 grams of KOH.

Each of the batteries from samples 1-6 was then tested according to the following ANSI/IEC C18.1M-1992 test protocols:
  1. Low-Intensity Flashlight: Applied a 2.2 Ohm load to the battery for four minutes every hour for eight hours a day, to a 0.9V cut-off.

2. High-Intensity Flashlight: Applied a 1.5 Ohm load to the battery for four minutes every 15 minutes, eight hours a day, to a 0.9V cut-off.
3. New Audio: Applied a load of 600 milliamps to the battery for two hours a day, to a 0.9V cut-off.
4. CD BoomBox: Applied a one amp load to the battery for one hour a day, to a 0.9V cut-off.
5. Radio: Applied a 10 Ohm load to the battery for four hours a day, to a 0.9V cut-off.
6. Toy: Applied a 2.2 Ohm load to the battery for one hour a day, to a 0.8V cut-off.
7. 2.2 Ohm 1.0V (Continuous): Applied a 2.2 Ohm load to the battery continuously, to a 1.0V cut-off.
8. 2.2 Ohm 0.8V (Continuous): Applied a 2.2 Ohm load to the battery continuously, to a 1.0V cut-off.

The results of the tests are shown in Table 1 below, which provides the amount of time, in hours, that it took each battery to reach the voltage cut-off prescribed for the test.

TABLE 1

|  | Sample 1 | Sample 2 | Sample 3 | Sample 4 | Sample 5 | Sample 6 |
| --- | --- | --- | --- | --- | --- | --- |
| Low-Intensity Flashlight | 25.79 | 26.64 | 26.50 | 26.82 | 26.50 | 26.36 |
| High-Intensity Flashlight | 16.57 | 16.53 | 16.39 | 16.74 | 16.66 | 16.58 |
| New Audio | 19.60 | 19.83 | 19.53 | 19.62 | 19.80 | 19.55 |
| CD BoomBox | 8.86 | 8.51 | 8.01 | 8.25 | 9.11 | 8.52 |
| Radio | 131.01 | 130.25 | 129.51 | 132.55 | 130.89 | 130.15 |
| Toy | 27.60 | 27.83 | 27.67 | 28.41 | 27.65 | 27.72 |
| 2.2 Ohm 1.0 V (Continuous) | 17.88 | 19.83 | 19.59 | 18.49 | 20.12 | 19.68 |
| 2.2 Ohm 0.8 V (Continuous) | 21.16 | 23.60 | 23.42 | 22.66 | 24.23 | 24.17 |

Other Embodiments

While certain embodiments have been described, other embodiments are possible.

As an example, while the formation of a cathode out of cathode pellets has been described, in some embodiments, one of the above-described methods can be used to form an anode out of one or more anode pellets.

As another example, in certain embodiments, cathode pellets having different properties (e.g., density) and/or dimensions can be used to form a cathode. For example, a cathode can be formed out of multiple cathode pellets of different heights.

As an additional example, in some embodiments, a mandrel can include lobes that are relatively evenly spaced apart around the mandrel body. Alternatively, a mandrel can include lobes that are not relatively evenly spaced apart around the mandrel body.

As a further example, in some embodiments, a mandrel can include at least two lobes that have different sizes and/or shapes. For example, a mandrel can include a relatively thick lobe and a relatively thin lobe.

As another example, while a punch that includes a sleeve slidably disposed around a mandrel has been shown, in some embodiments, a punch can have another configuration. As an example, a punch can include a mandrel that is rotatable with respect to a sleeve that is disposed around the mandrel. As another example, a punch can include a mandrel that is fixedly attached to a compacting body (i.e., such that the compacting body does not slide relative to the mandrel). For example, FIG. 6A shows a punch 500 including a mandrel 510 that is fixedly attached to a compacting body 520. As shown in FIG. 6B, punch 500 can be inserted into a battery housing 550, such that mandrel 510 is disposed within holes 540 of cathode pellets 560. Thereafter, punch 500 can be pressed down in the direction of arrow A1, such that compacting body 520 compacts cathode pellets 560.

As an additional example, while mandrels with relatively regular transverse cross-sections have been shown, in some embodiments, a mandrel can have an irregular transverse cross-section.

As a further example, while cylindrical cathode pellets have been described, in some embodiments, a cathode pellet can have another shape. For example, a cathode pellet may have a rectangular transverse cross-section. Alternatively or additionally, a cathode pellet may have a hole with a non-circular (e.g., rectangular) transverse cross-section. In such embodiments, any of the dimensions (e.g., width, length) of the transverse cross-section of the hole may have the same value as $ID_{120}$ of cathode pellets 120 (described with reference to FIG. 2A). In certain embodiments, the hole in such a cathode pellet can have a transverse cross-section with an area that is equal to the area of the transverse cross-section of a hole 121 in a cathode pellet 120.

As another example, while battery housings with circular transverse cross-sections have been described, in some embodiments, a battery can have a housing with a non-circular (e.g., rectangular, square, oval, elliptical) transverse cross-section.

Figure 7A:
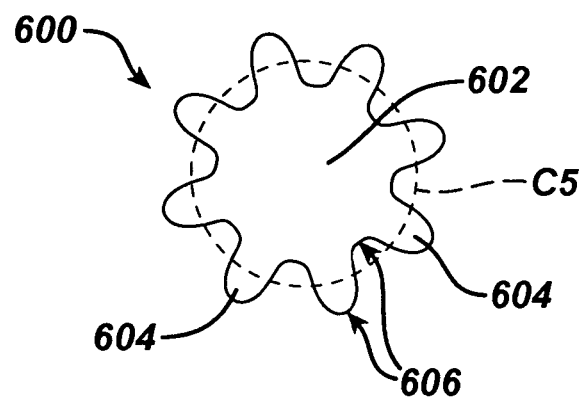
FIG. 7A is a transverse cross-sectional view of an embodiment of an apparatus for forming an electrode.
Figure 7B:
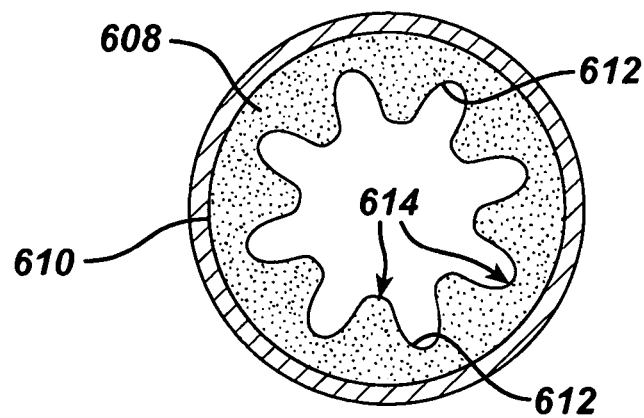
FIG. 7B is a transverse cross-sectional view of an embodiment of a cathode made using the apparatus of FIG. 7A.

As a further example, in some embodiments, a punch can include a mandrel having a sinusoidal cross-section. For example, FIG. 7A shows a transverse cross-sectional view of a mandrel 600. As shown in FIG. 7A, mandrel 600 that has a sinusoidal transverse cross-section. Mandrel 600 has a mandrel body 602 and lobes 604 that are integrally formed with mandrel body 602. As shown, mandrel 600 has a surface 606 that is sinusoidal with respect to a circle C5. Mandrel 600 can be used, for example, to form a grooved cathode 608 (shown in a housing 610 in FIG. 7B) with grooves 612 that form a sinusoidal surface 614.

Figure 8:
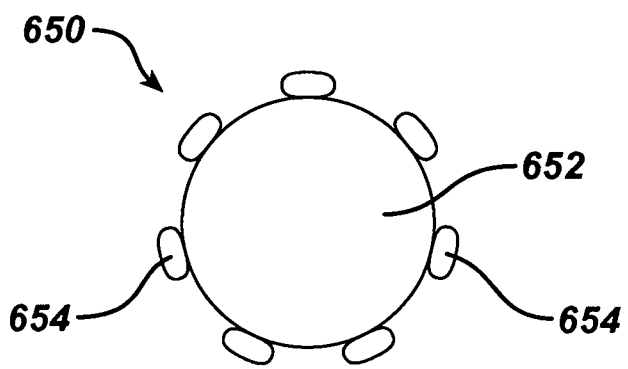
FIG. 8 is a transverse cross-sectional view of an embodiment of an apparatus for forming an electrode.
Figure 9:
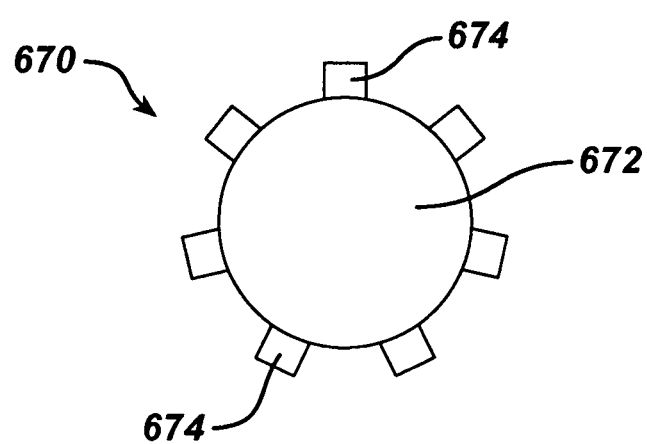
FIG. 9 is a transverse cross-sectional view of an embodiment of an apparatus for forming an electrode.
Figure 10:
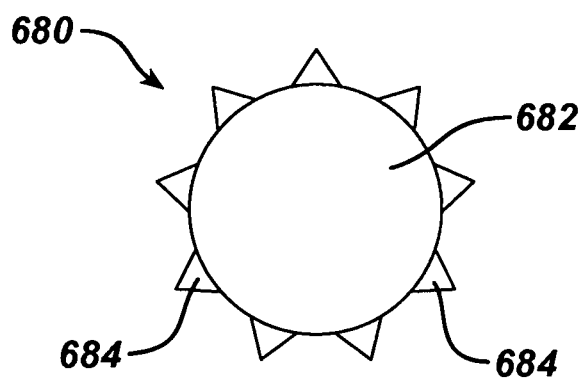
FIG. 10 is a transverse cross-sectional view of an embodiment of an apparatus for forming an electrode.
Figure 11:
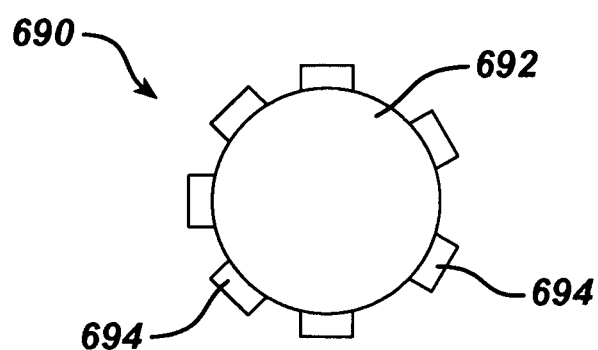
FIG. 11 is a transverse cross-sectional view of an embodiment of an apparatus for forming an electrode.

As an additional example, while lobes with certain shapes have been shown, in some embodiments, a mandrel can include one or more lobes with other shapes. As an example, FIG. 8 shows a transverse cross-sectional view of a mandrel 650. Mandrel 650 includes a mandrel body 652 and lobes 654 that are attached to mandrel body 652. Lobes 654 each have an elliptical transverse cross-section. As another example, in certain embodiments, one or more lobes on a mandrel can have a non-rounded (e.g., angular) surface. For example, FIG. 9 shows a transverse cross-sectional view of a mandrel 670. Mandrel 670 includes a mandrel body 672 and lobes 674 that are attached to mandrel body 672. Lobes 674 each have a square transverse cross-section. FIG. 10 shows a transverse cross-sectional view of a mandrel 680. Mandrel 680 includes a mandrel body 682 and lobes 684 that are attached to mandrel body 682. Lobes 684 each have a triangular transverse cross-section. FIG. 11 shows a transverse cross-sectional view of a mandrel 690. Mandrel 690 includes a mandrel body 692 and lobes 694 that are attached to mandrel body 692. Lobes 694 each have a rectangular transverse cross-section.

As another example, in some embodiments, a punch can be formed of at least two separate components that can be attached to each other. For example, FIG. 12A shows a mandrel 700 including a mandrel body 701 and lobes 702. Mandrel body 701 and/or lobes 702 can be formed of, for example, carbide and/or one or more ceramics. In certain embodiments, mandrel 700 can be formed from a molded ceramic blank. At one of its ends, mandrel 700 includes an insertable portion 704. Insertable portion 704 can be formed of, for example, steel. In some embodiments, insertable portion 704 can be formed using a molding method. Insertable portion 704 is adapted to be inserted into a cavity 706 of a punch component 708 shown in FIG. 8B. Punch component 708 includes a body 710 with a handle 712. A sleeve 714 is slidably disposed around body 710. Body 710, handle 712, and/or sleeve 714 can be formed of, for example, steel. In some embodiments, insertable portion 704 can be formed using a molding method. When mandrel 700 and punch component 708 are attached to each other, they form a punch. Mandrel 700 and punch component 708 can be attached to each other by inserting insertable portion 704 of mandrel 700 into cavity 706 of punch component 708. In certain embodiments, insertable portion 704 and cavity 706 can have threaded surfaces, so that insertable portion 704 can be threaded into cavity 706. In some embodiments, an insertable portion such as insertable portion 704 can extend through a greater portion (e.g., through the entirety) of a mandrel body such as mandrel body 701. This can, for example, allow the insertable portion to provide support for the mandrel body.

All references, such as patent applications, publications, and patents, referred to herein are incorporated by reference in their entirety.

Other embodiments are in the claims.

What is claimed is:

1. A method of making an electrode within a battery housing, the method comprising:
    inserting a pellet having an upper surface and defining an existing cylindrical opening and comprising an electrode composition into a housing;
    passing a mandrel comprising at least one lobe through the existing cylindrical opening in the pellet within the housing; and
    applying pressure to the upper surface of the pellet to form an electrode for a battery within the housing,
    wherein the pressure is applied to the upper surface pellet either while the mandrel is passed through the cylindrical opening or after the mandrel is passed through the cylindrical opening.

2. The method of claim 1, wherein passing a mandrel through an opening defined by a pellet comprises forming at least one groove in the pellet.

3. The method of claim 1, wherein applying pressure to the upper surface of the pellet comprises contacting the upper surface of the pellet with a sleeve that slidably receives the mandrel.

4. The method of claim 3, wherein contacting the upper surface of the pellet with a sleeve comprises applying a pressure of at most about 5,000 psi to the sleeve.

5. The method of claim 1, wherein the mandrel comprises a mandrel body and the lobe is integrally formed with the mandrel body.

6. The method of claim 5, wherein the mandrel body has a circular transverse cross-section.

7. The method of claim 1, wherein the at least one lobe has a rounded surface.

8. The method of claim 1, wherein the at least one lobe has an angular surface.

9. The method of claim 1, wherein the housing has a circular transverse cross-section.

10. The method of claim 1, wherein the housing has a non-circular transverse cross-section.

11. The method of claim 1, wherein the pellet has an exterior surface and the housing has an interior surface, and a distance between the interior surface of the housing and the exterior surface of the pellet is at least 0.0001 millimeter.

12. The method of claim 1, wherein the pellet has an exterior surface and the housing has an interior surface, and a distance between the interior surface of the housing and the exterior surface of the pellet is at least about 0.08 millimeter.

13. The method of claim 1, wherein the pellet comprises a cathode composition.

14. The method of claim 1, wherein the pellet is cylindrical.

15. The method of claim 3, wherein contacting the upper surface of the pellet with the sleeve comprises applying a pressure of at least about one psi to the sleeve.

16. The method of claim 1, wherein the mandrel comprises a ceramic, steel, a carbide, or a combination thereof.

17. The method of claim 1, wherein the mandrel comprises yttrium-stabilized zirconia.

* * * * *